United States Patent Office 3,586,625
Patented June 22, 1971

---

3,586,625
TREATMENT OF AQUEOUS STREAMS FOR REMOVAL OF NITROGEN AND PHOSPHORUS COMPOUNDS
Edward L. Cole and Raymond F. Wilson, Fishkill, and Howard V. Hess, Glenham, N.Y., assignors to Texaco Inc., New York, N.Y.
Filed Dec. 12, 1969, Ser. No. 884,431
Int. Cl. C02c 1/02
U.S. Cl. 210—16       3 Claims

ABSTRACT OF THE DISCLOSURE

A proces for the treatment of aqueous biological wastes and/or other liquids containing pollutional materials to produce an effluent having a low COD (BOD) and a substantially reduced concentration of soluble nitrogen and phosphorus compounds wherein a waste water stream is fed to a coking zone and heated to a temperature in the range of 400 to 700° F. under sufficient pressure to prevent the vaporization of water to form coke, carbon dioxide, and low molecular weight oxygenated organic compounds which are separated from the treated sewage aqueous effluent; this effluent is oxidized with air at a temperature above about 450° F. under sufficient pressure to prevent the vaporization of water and either the carbon dioxide or the oxygenated organic compounds or both are introduced at selected points in the waste water stream to stimulate the growth of microorganisms which consume soluble nitrogen and phosphorus compounds, which microorganisms are then sent on to the coking zone for coking. By thus stimulating biological processes which consume nitrogen and phosphorus compounds there is produced an effluent which can be discharged into bodies of water without causing eutrophication of the waters.

BACKGROUND OF THE INVENTION

This invention relates to a process for the treatment of biological sewage wastes wherein byproducts produced in the process are used to further reduce the concentration of nitrogen and phosphorus compounds of the final aqueous effluent resulting from the process.

In an earlier process, it has been suggested to coke biological wastes so as to effect very substantial reduction in the chemical and biological oxygen demand thereof. In addition to achieving such reduction the process produces carbon dioxide and low molecular weight carbon-oxygen - hydrocarbon compounds as by - products. By means of this process the total nitrogen and phosphorus content of the aqueous effluent product relative to the feed was also reduced. However, and particularly in those instances where the influent has a high nitrogen and phosphorus content, appreciable amounts of these elements remain in the effluent. To avoid excessive plant growth which might lead to eutrophication of the body of water receiving the effluent, these elements must be removed.

SUMMARY OF THE INVENTION

In accordance with the claimed invention, a biological waste feed stream or other liquid containing pollutional materials is supplied with the aforementioned by-products which stimulate the growth of microorganisms consuming soluble phosphorus and nitrogen - containing compounds.

DETAILED DESCRIPTION OF THE INVENTION

The biological processes utilized by the invention for removing phosphorus and nitrogen as well as compounds containing these elements include autotrophic and heterotrophic processes. In the former, growth of plants such as algae depends on photosynthesis to supply the energy required for synthesizing complex molecules from simple building blocks such as $CO_2$, $NH_3$, $NO_2^-$ and $PO_4^\equiv$.

Heterotrophic processes occur in animals such as protozoa, bacteria and fungi which require the more complex organic molecules such as glucose, lipids or amino acids manufactured by autotrophic cells. Included here are both the aerobic and anaerobic processes which utilize molecular oxygen or other molecules as oxidizing agents. These last named processes can be represented as follows:

Aerobic process

Building blocks+energy→macromolecules+$H_2O$

Anaerobic process (denitrification)

[1] Soluble carbon source.

In connection with the above-outlined processes, it is known that the gross composition of biological growth is $C_5H_7NO_2$ which indicates that 0.124 pound of nitrogen will be required for each pound of growth. As regards the amount of phosphorus required per pound of growth the same is put as 0.026 pound.

BRIEF DESCRIPTION OF THE DRAWING

The process of the invention can best be described by reference to the accompanying drawing wherein.

DESCRIPTION OF SPECIFIC EMBODIMENTS

The following examples serve to illustrate, but do not limit, the invention.

In the following examples, and throughout the specification, the term "chemical oxygen demand," abbreviated "COD," is used in the usual sense. Thus COD denotes the total oxidizable material present in the liquid under consideration regardless of whether or not it is biodegradable. BOD tests, on the other hand, denote the amount of oxygen consumed during a five day period of bacterial activity at 20° C. on a chemically standardized and stabilized sample. Although COD is not strictly comparable to the biological oxygen demand (BOD), it is believed sufficiently useful as an indication of reduction of BOD to provide a basis for comparison of the effectiveness of alternate methods of treatment, particularly when applied to comparable waste samples.

EXAMPLE 1

Figure 1:
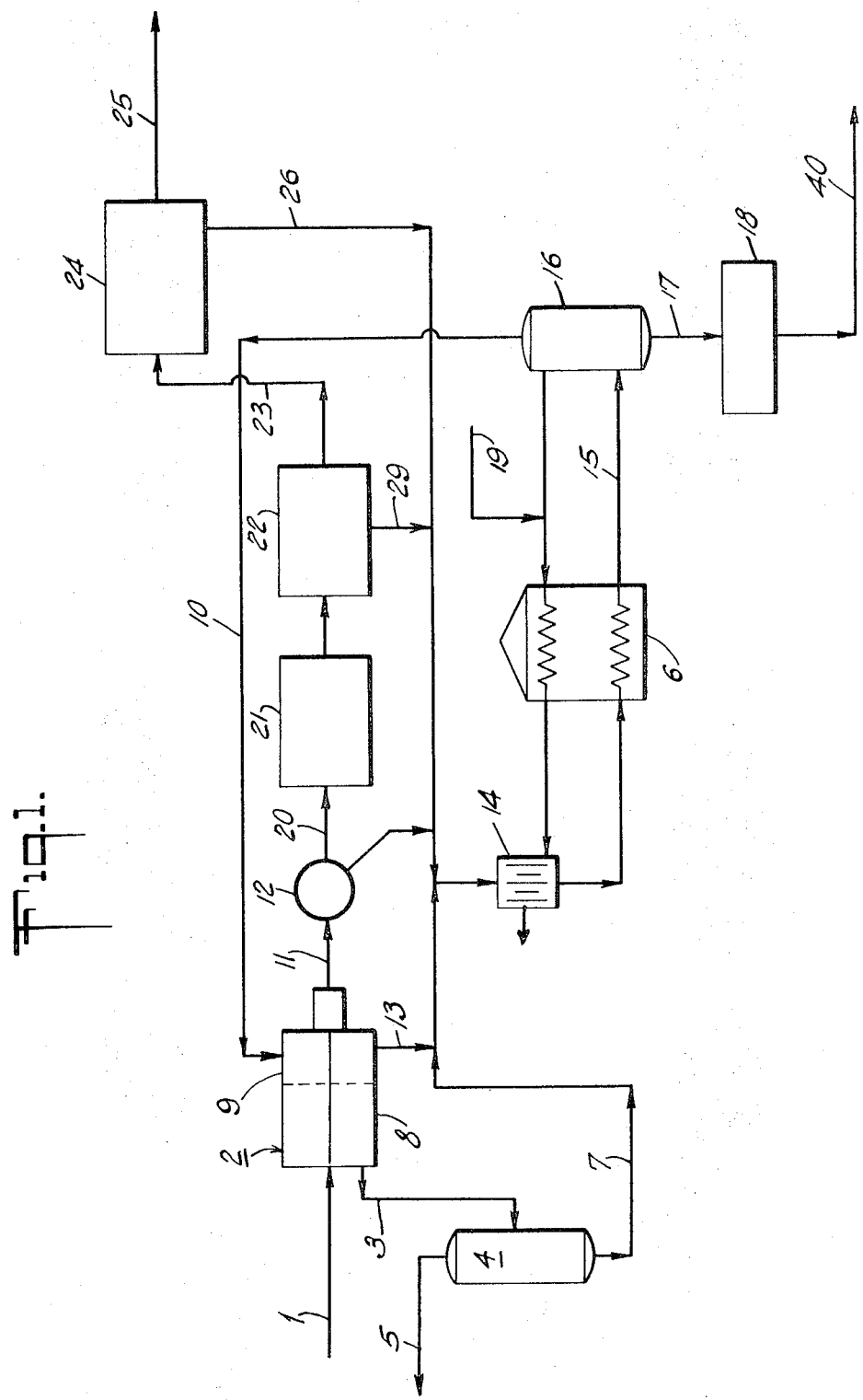
FIG. 1 is a flow diagram of apparatus for treating wastes to reduce the COD thereof and the nitrogen and phosphorus present therein by recycling $CO_2$ to the API separator and FIG. 2 is the same for an installation for accomplishing the same result by the injection of $CO_2$ and of low molecular weight oxygenated compounds into a retention pond.

The waste water-disposal facilities of a petroleum-chemical complex are shown schematically in FIG. 1. In the system shown, the discharge from the basin is into a stream used for recreational purposes. The problem solved in this connection by the claimed invention is to minimize discharge of nitrates, ammonia and soluble phosphates into the stream so as to prevent algae "bloom." Algae blooms are encouraged by the presence of these nutrients and the proliferation of plant growth in waters receiving the discharge results in eutrophication thereof, death of aquatic animals, a persistant fish-like taste in the water and a foul odor.

In the system shown in FIG. 1, primary sewage treatment is effected on aqueous sludge which is introduced by pumping or otherwise through line 1 into a two channel API-type water-oil separator 2 where floating oils are skimmed and the sediments are removed. The oil passes through line 3 into settling tank 4 where the oil layer is returned to the refinery through line 5 and the oil-water emulsion is sent to tube heater 6 through line 7.

The API separator 2 is one designed to handle 2,000 gallons of waste water per minute and normally averages about 60 percent of capacity. Process water passes into the forebays 8 of the API separator where about 90 percent of the oil is removed by slotted pipe oil skimmers (not shown). The skimmed oil from forebays 8 passes to the afterbays 9 where algae growth is promoted by addition of carbon dioxide obtained from the coking operation and sent on through line 10. The addition of carbon dioxide is made by means of spargers (not shown) which are distributed in the front half of the afterbays 9 at a depth of about 5 ft. below the water surface. The introduction of carbon dioxide at this point in the system promotes algae growth which in the past has not been sought because it created emulsion difficulties. With the coking step of the invention the sludge consisting of algae-oil-water is easily broken up. After passing through the separator, the water passes through line 11 into clarifier 12 where lime, alum and activated silica are added to facilitate coagulation. The sludge from the clarifier together with the oil-water emulsion coming from settling tank 4 through line 7 and sediment coming from separator 2 through line 13 pass through heat exchanger 14 for preheating to about 200° F. and then are coked in fired tube heater 6. The products of this operation pass through line 15 into separator 16 where the coke is removed through line 17 into blowdown tank 18 for disposal through line 40. Carbon dioxide formed during the coking operation together with small amounts of $H_2$ and low molecular weight hydrocarbons, is vented through line 10 into the previously mentioned spargers. Effluent liquid is returned to heater 6 for oxidation at a temperature above about 450° F. under sufficient pressure to prevent vaporization of water after introduction of air therein through line 19.

Liquid effluent from clarifier 12 passes through line 20 into the biological oxidation trickling filter 21 where it undergoes secondary treatment and then is further treated in activated sludge unit 22. Sludge from 22 is passed by lines 29 and 26 into heat exchanger 14. Liquid freed of activated sludge is then pumped through line 23 into one of two retention ponds generally indicated by reference character 24 and in which additional settling takes place. The clear effluent is discharged through line 25 and through hay filters (not shown) to the stream. Periodically any sludge that accumulates in the retention pond is sent on through line 26 into fired tube heater 6 for coking. During a 6-month period of testing, the quality of the effluent discharged into the stream had the following average composition as compared to a 6-month period when carbon dioxide was not injected.

AVERAGE FINAL EFFLUENT WATER QUALITY

| | Test period | |
|---|---|---|
| | With $CO_2$ injection into API separator | Without $CO_2$ injection into API separator |
| Phenols, p.p.m. | 0.12 | 0.1 |
| Phosphorus, mg./l.[1] | 0.05 | 0.23 |
| Nitrogen, mg./l.[1] | 0.6 | 2.5 |
| Oil, p.p.m. | 5 | 5 |

[1] Inorganic.

EXAMPLE 2

Figure 2:
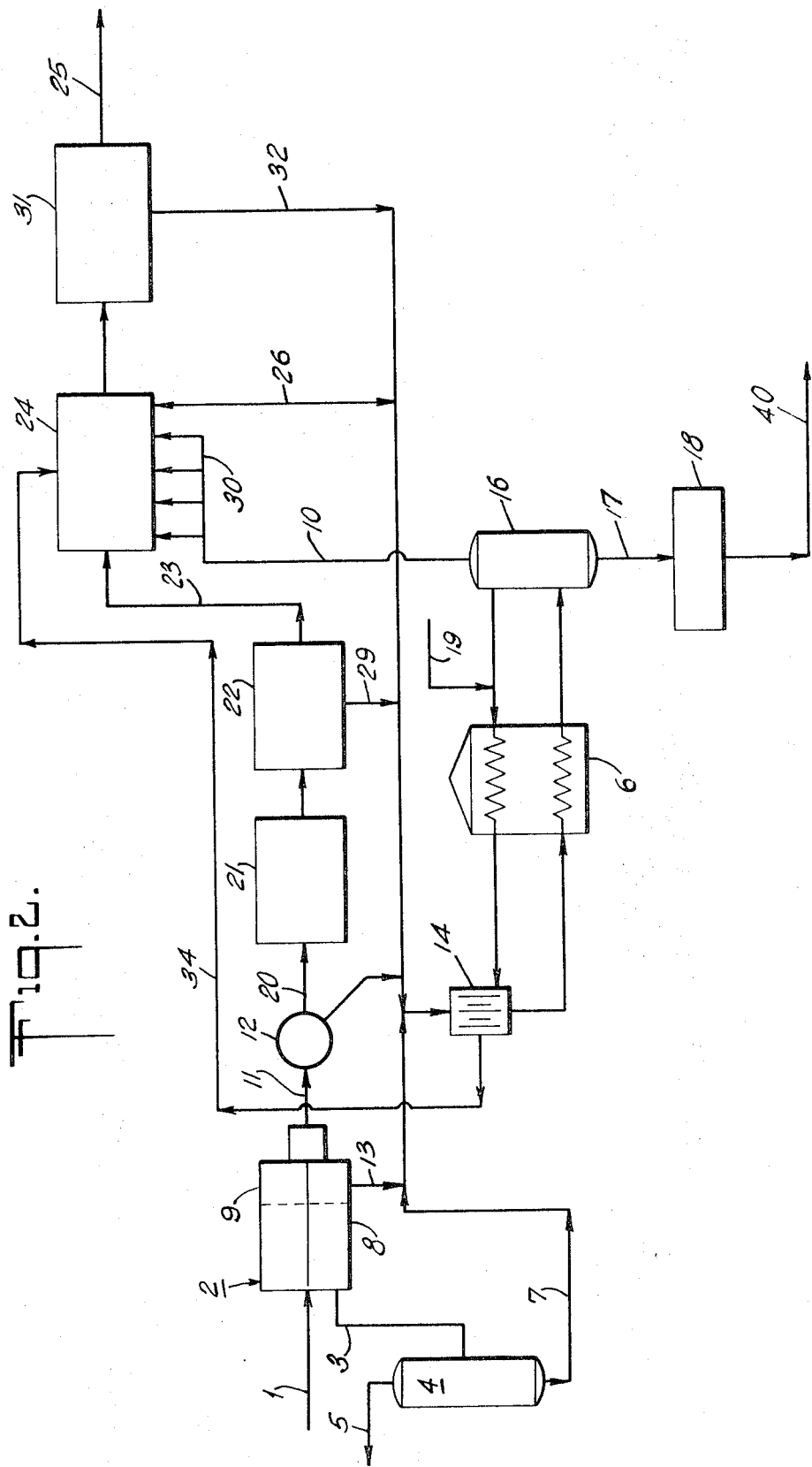

Another embodiment of the invention is shown in FIG. 2. The system is basically the same as that shown in FIG. 1 except that the gas stream is directed to spargers located near the bottom of the first retention pond and that the low BOD liquid containing low molecular weight oxygenated organic compounds is directed to the first retention pond and that the retention ponds are operated in series.

Here, the discharge from the second retention pond is into the stream and it is desired to prevent algae blooms by controlling the discharge of ammonia, nitrates and soluble phosphates. As the elements of the system of FIG. 2 are essentially the same as those of the system of FIG. 1, it will be necessary only to describe the additional elements present in FIG. 2. Thus, gas from the coking operation is bled into retention pond 24 through line 10 by means of spargers schematically designated by reference character 30. The spargers 30 are located about 5 feet from the bottom of retention pond 24, which is 10 feet deep. This pond by virtue of its depth is divided into a top or euphotic zone where algae growth will occur, and a bottom or anaerobic zone where denitrification occurs. Carbon dioxide is introduced into the above by the spargers 30 to promote algae growth while the liquid from fired heater 6 is introduced into the bottom portion of the zone through line 34 to promote denitrification reactions. These reactions are promoted because the oxidized stream which has a BOD of about 300 to 2500 contains low molecular weight organic compounds which act as a food for denitrifying bacteria under anaerobic conditions.

As in the embodiment of FIG. 1, sludge is pumped periodically from retention ponds 24 and 31 through lines 26 and 32, respectively, to fired heater 6. The clear effluent is discharged from retention pond 31 through line 25 and through hay filters (not shown).

During a 12-month period of testing, carbon dioxide was injected into pond 24 and the oxidized liquid stream was introduced into the bottom portion of the pond. The average performance relative to a similar period when neither carbon dioxide nor the oxidized liquid stream was introduced is given by the following table.

AVERAGE FINAL EFFLUENT WATER QUALITY

| | Test Period | |
|---|---|---|
| | With injection into pond | Without injection into pond |
| Phenols, p.p.m. | 0.15 | 0.1 |
| Phosphorus, mg./l.[1] | 0.03 | 0.23 |
| Nitrogen, mg./l.[1] | 0.3 | 2.5 |
| Oil, p.p.m. | 5 | 5 |

[1] Inorganic.

During the period of testing the oxidized stream had on the average 0.067 weight percent low molecular oxygenated organics calculated as methyl alcohol. This material was utilized with about 40 percent efficiency in the denitrification reaction. The remaining nitrogen and phosphorus is removed by algae growth and in the process it is estimated that probably somewhat less than 10% of the carbon available in the $CO_2$ is utilized.

It will be noted that the foregoing examples utilize an API separator which device is pecular to the petroleum industry. However, the API separator corresponds to some extent to the usual primary settler used in municipal installations and can be used with minor modifications instead of a primary settler. For the purposes of this invention, then, an API separator and a primary settler are equivalent.

Warm temperatures are desirable in the apparatus for the growth rate of organisms and the optimum temperature ranges from about 68 to about 100° F. The response of different organisms is different for the various temperatures, thus at 100° F. one organism will predominate in the culture whereas at 70° F. another type will predominate. However, in the systems under consideration temperatures advantageously should be kept within about 10° F. to prevent large scale deaths of one species. Heat may be supplied by exchange with the coked hot liquid, and the temperature may thus be controlled to favor the growth of certain microorganisms over others.

Sunlight is needed for algae growth, however, high intensity light is not necessary and periods of dark are desirable. The sparging action of the $CO_2$ will introduce desirable turbulence so the algae cells will alternately be exposed to periods of light and dark. Artificial light may be used advantageously at intervals during the night.

Obviously, many modifications and variations of the invention, as hereinbefore set forth, may be made without departing from the spirit and scope thereof, and therefore only such limitations should be imposed thereon as are indicated in the appended claims.

We claim:
1. A process for treating an aqueous stream containing oil, an oil-water emulsion and sediments to produce an aqueous effluent having a lowered chemical oxygen demand and a reduced concentration of nitrogen and phosphorus compounds comprising, in combination,
 (a) flowing said stream to primary settling means having first and second sections;
 (b) withdrawing said sediments from said stream;
 (c) removing oil and an oil-water emulsion from said stream;
 (d) separating said oil from said oil-water emulsion in a separation zone;
 (e) recovering said oil;
 (f) adding coagulants to said stream to form a sludge and removing said sludge thereby leaving behind clarified water;
 (g) flowing said clarified water to at least one retention site and periodically removing sludge from said water;
 (h) biologically oxidizing said water;
 (i) passing said oxidized water to an activated sludge unit;
 (j) removing sludge from said water while said water is in said unit;
 (k) preheating said sediments, said oil-water emulsion and said sludges from steps (f), (g) and (j) by heat exchange with oxidized effluent from a subsequent oxidation step;
 (l) coking the above preheated charge in a coking zone at a temperature of about 400 to about 700° F. under sufficient pressure to prevent the vaporization of water thereby forming coke, a gaseous stream containing carbon dioxide and low molecular weight hydrocarbons and an aqueous effluent;
 (m) injecting said carbon dioxide gaseous stream in said stream to stimulate the growth of agents which consume nitrogen and phosphorus compounds; and
 (n) oxidizing said aqueous effluent with air and using the oxidized effluent in step (k) prior to disposing of same.

2. The process according to claim 1, comprising passing said clarified water from step (f) into a first retention pond divided between a euphotic zone and an anaerobic zone; introducing said carbon dioxide gaseous stream from step (l) into said euphotic zone and oxidized effluent from step (n) into said anaerobic zone to promote denitrification reactions; removing the resulting sludges from said zones and coking said sludges.

3. The process according to claim 1, wherein said carbon dioxide gaseous stream from step (l) is injected into said second section of said settling means.

References Cited
UNITED STATES PATENTS

| | | | |
|---|---|---|---|
| 2,391,494 | 12/1945 | Walker | 210—195X |
| 3,152,983 | 10/1964 | Davis et al. | 210—11 |
| 3,356,609 | 12/1967 | Bruemmer | 210—18 |
| 3,507,788 | 4/1970 | Cole et al. | 210—63 |

REUBEN FRIEDMAN, Primary Examiner

T. G. WYSE, Assistant Examiner

U.S. Cl. X.R.

210—47